(12) United States Patent
Schulte

(10) Patent No.: US 7,123,365 B1
(45) Date of Patent: Oct. 17, 2006

(54) METHOD OF CALIBRATING AN INTERFEROMETER OPTICS AND METHOD OF PROCESSING AN OPTICAL ELEMENT HAVING AN ASPHERICAL SURFACE

(75) Inventor: Stefan Schulte, Aalen-Waldhausen (DE)

(73) Assignee: Carl Zeiss SMT AG, Oberkochen (DE)

( * ) Notice: Subject to any disclaimer, the term of this patent is extended or adjusted under 35 U.S.C. 154(b) by 396 days.

(21) Appl. No.: 10/792,755

(22) Filed: Mar. 5, 2004

(51) Int. Cl.
*G01B 9/02* (2006.01)

(52) U.S. Cl. .................... 356/512; 356/511; 356/512; 356/513; 356/514

(58) Field of Classification Search ............... 356/511, 356/512, 513, 514, 515
See application file for complete search history.

(56) References Cited

U.S. PATENT DOCUMENTS

| | | | |
|---|---|---|---|
| 4,340,306 A | 7/1982 | Balasubramanian | |
| 4,732,483 A | 3/1988 | Biegen | |
| 5,361,312 A | 11/1994 | Kuchel | |
| 5,473,434 A | 12/1995 | de Groot | |
| 5,488,477 A | 1/1996 | de Groot | |
| 5,548,403 A | 8/1996 | Sommargren | |
| 5,777,741 A | 7/1998 | Deck | |
| 5,982,490 A | 11/1999 | Ichikawa et al. | |
| 6,456,382 B1* | 9/2002 | Ichihara et al. | 356/513 |
| 6,714,307 B1* | 3/2004 | De Groot et al. | 356/512 |
| 6,717,679 B1* | 4/2004 | Kuchel | 356/513 |
| 6,781,700 B1* | 8/2004 | Kuchel | 356/513 |
| 6,940,607 B1* | 9/2005 | Freimann et al. | 356/521 |
| 7,050,175 B1* | 5/2006 | Freimann et al. | 356/512 |
| 2002/0063867 A1 | 5/2002 | Otto | |
| 2003/0025915 A1* | 2/2003 | Freimann et al. | 356/512 |
| 2003/0090678 A1* | 5/2003 | Evans et al. | 356/515 |
| 2003/0223081 A1* | 12/2003 | Freimann | 356/512 |
| 2004/0174531 A1* | 9/2004 | Freimann | 356/512 |
| 2005/0275849 A1* | 12/2005 | Freimann et al. | 356/521 |

FOREIGN PATENT DOCUMENTS

| | | |
|---|---|---|
| WO | WO 03/002933 A1 | 1/2003 |

OTHER PUBLICATIONS

D. Malacara, "Twyman-Green Interferometer", Optical Shop Testing, Second Edition, Wiley Interscience Publication 1992, Chap. 2.1, pp. 51-53, John Wiley & Sons, Inc.
D. Malacara, "Variations from the Twyman-Green Interferometer", Optical Shop Testing, Second Edition, Wiley Interscience Publication 1992, Chap. 2.6, pp. 73-77, John Wiley & Sons, Inc.

(Continued)

*Primary Examiner*—Gregory J. Toatley, Jr.
*Assistant Examiner*—Denise B Anderson
(74) *Attorney, Agent, or Firm*—Jones Day

(57) ABSTRACT

A method of processing an optical element comprises providing an interferometer optics; arranging a calibrating substrate in a beam of measuring light emitted by the interferometer optics; superimposing measuring light having traversed the first and second surfaces of the calibrating substrate with reference light, and taking a first interferometric measurement of the superimposed measuring light and reference light; arranging the aspherical surface of the optical element in the beam of measuring light emitted by the interferometer optics, while the calibrating substrate is not arranged in the beam of measuring light; superimposing measuring light having interacted with the aspherical surface and the reference light, and taking a second interferometric measurement of the superimposed measuring light and reference light; determining deviations of the aspherical surface from a target shape thereof in dependence of the first and second measurements; and machining the aspherical surface of the optical element.

21 Claims, 4 Drawing Sheets

OTHER PUBLICATIONS

A. Offner and D. Malacara, "Null Tests Using Compensators", Optical Shop Testing, Second Edition, Wiley Interscience Publication 1992, Chap. 14, pp. 501-598, John Wiley & Sons, Inc.

J. Greivenkamp and J. Bruning, "Phase Shift Interferometry", Optical Shop Testing, Second Edition, Wiley Interscience Publication 1992, Chap. 12, pp. 427-454, John Wiley & Sons, Inc.

P.P. Naulleau et al, "Extreme-ultraviolet phase-shifting point diffraction interferometer: a wave-front metrology tool with subangstrom reference-wave accuracy." Applied Optics, vol. 38, No. 35, Dec. 10, 1999, pp. 7252-7263.

S. Schulte et al., copending U.S. Appl. No. 10/743,792, filed Dec. 24, 2003.

* cited by examiner

METHOD OF CALIBRATING AN INTERFEROMETER OPTICS AND METHOD OF PROCESSING AN OPTICAL ELEMENT HAVING AN ASPHERICAL SURFACE

FIELD OF THE INVENTION

The present invention relates to the field of measuring and manufacturing aspherical optical surfaces. In particular the invention relates to a method of calibrating an interferometer optics for measuring an aspherical optical surface and a method of processing an aspherical surface by using the interferometer optics.

BACKGROUND OF THE INVENTION

The optical element having the aspherical surface is, for example, an optical component such as an optical lens or an optical mirror used in optical systems, such as telescopes used in astronomy, or optical systems, used for imaging structures of a mask such as a reticle, onto a radiation sensitive substrate, such as a resist, in a lithographic process. The success of such an optical system is substantially determined by the precision with which the optical component can be machined or manufactured to have a target shape. In such manufacture, it is necessary to compare the shape of a surface of the machined optical component with its target shape, and to determine differences between the machined and target surfaces. The surface is then further machined at those areas where the differences between the machined and target surfaces exceed e.g. a predefined threshold.

In order to precisely measure the shape of an optical surface, an interferometer apparatus is commonly used. Examples of conventional interferometer apparatuses are disclosed in U.S. Pat. No. 4,732,483, U.S. Pat. No. 4,340,306, U.S. Pat. No. 5,473,434, U.S. Pat. No. 5,777,741, U.S. Pat. No. 5,488,477, which documents are incorporated herein by reference.

The conventional interferometer apparatus for measuring an aspherical optical surface typically includes a light source for generating a beam of measuring light having flat or spherical wavefronts and arranging a flat reference surface or spherical reference surface, respectively, in the beam of measuring light for generating a reference beam reflected from the references surface. Since flat or spherical reference surfaces may be manufactured and independently tested with a high accuracy, the reference beam will have substantially flat or spherical wavefronts. The beam of measuring light will further traverse a null lens arrangement or compensator which transforms the flat or spherical wavefronts of the beam of measuring light to an aspherical wavefront corresponding to the optical surface to be tested. Background information relating to null lens arrangements or compensators is available e.g. from Daniel Malacara, "Optical Shop Testing", $2^{nd}$ Edition, John Wiley & Sons Inc., 1992, chapter 12. The aspherical wavefronts will be reflected from the optical surface to be tested, and traverse the null lens arrangement such that the reflected aspherical wavefronts will be transformed to closely spherical or flat wavefronts which are superimposed with the wavefronts of the reference beam to generate an interference pattern on a detector. From the interference pattern it is possible to determine the shape of the aspherical optical surface relative to the reference surface. One source of errors in such determination results from a limited accuracy with which the optical effect of the null lens arrangement is known.

SUMMARY OF THE INVENTION

The present invention has been accomplished taking the above problems into consideration.

Thus, it is an object of the present invention to provide an improved method of testing and manufacturing aspherical optical surfaces.

Further, it is an object of the present invention to provide an improved method of calibrating a null lens arrangement for testing aspherical surfaces.

The foregoing objects are accomplished by providing a method for calibrating an interferometer optics by arranging a calibrating substrate of a calibrated optical performance in a beam of measuring light emitted by the interferometer optics, reflecting the beam from a calibrated mirror, and superimposing the reflected beam with a reference beam.

According to an exemplary embodiment, there is provided a method of calibrating an interferometer optics for measuring aspherical optical surfaces, the method comprising:

arranging a calibrating substrate having a first surface and a second surface opposite the first surface in a beam of measuring light emitted by the interferometer optics;

superimposing measuring light having traversed the first and second surfaces of the calibrating substrate and reference light and taking a first interferometric measurement of the superimposed measuring light and reference light; and determining-optical properties of the interferometer optics in dependence of the first measurement.

According to a further exemplary embodiment, the calibrating substrate has substantially flat surfaces which are, in particular, parallel to each other.

The invention further provides a method of processing an optical element having an aspherical surface, wherein the method comprises: calibrating the interferometer optics with the method illustrated above, arranging the aspherical surface in the beam of measuring light, taking a second interferometric measurement of the aspherical surface, and determining deviations of the aspherical surface from a target shape thereof in dependence of the first and second measurements.

According to an exemplary embodiment, the interferometer optics has an optical axis, and the determined deviations are substantially rotationally symmetric deviations with respect to the optical axis.

According to an embodiment of the invention, the method of processing the aspherical surface further includes machining of the aspherical surface after measuring the same, wherein the machining is performed in dependence of the determined deviations.

According to a further embodiment, the machining includes finishing of the optical surface, wherein the finishing may comprise applying a coating to the optical surface, such as a reflective coating, an anti-reflective coating and a protective coating.

BRIEF DESCRIPTION OF THE DRAWINGS

The foregoing as well as other advantageous features of the invention will be more apparent from the following detailed description of exemplary embodiments of the invention with reference to the accompanying drawings, wherein.

DETAILED DESCRIPTION OF EXEMPLARY EMBODIMENTS

Figure 1:
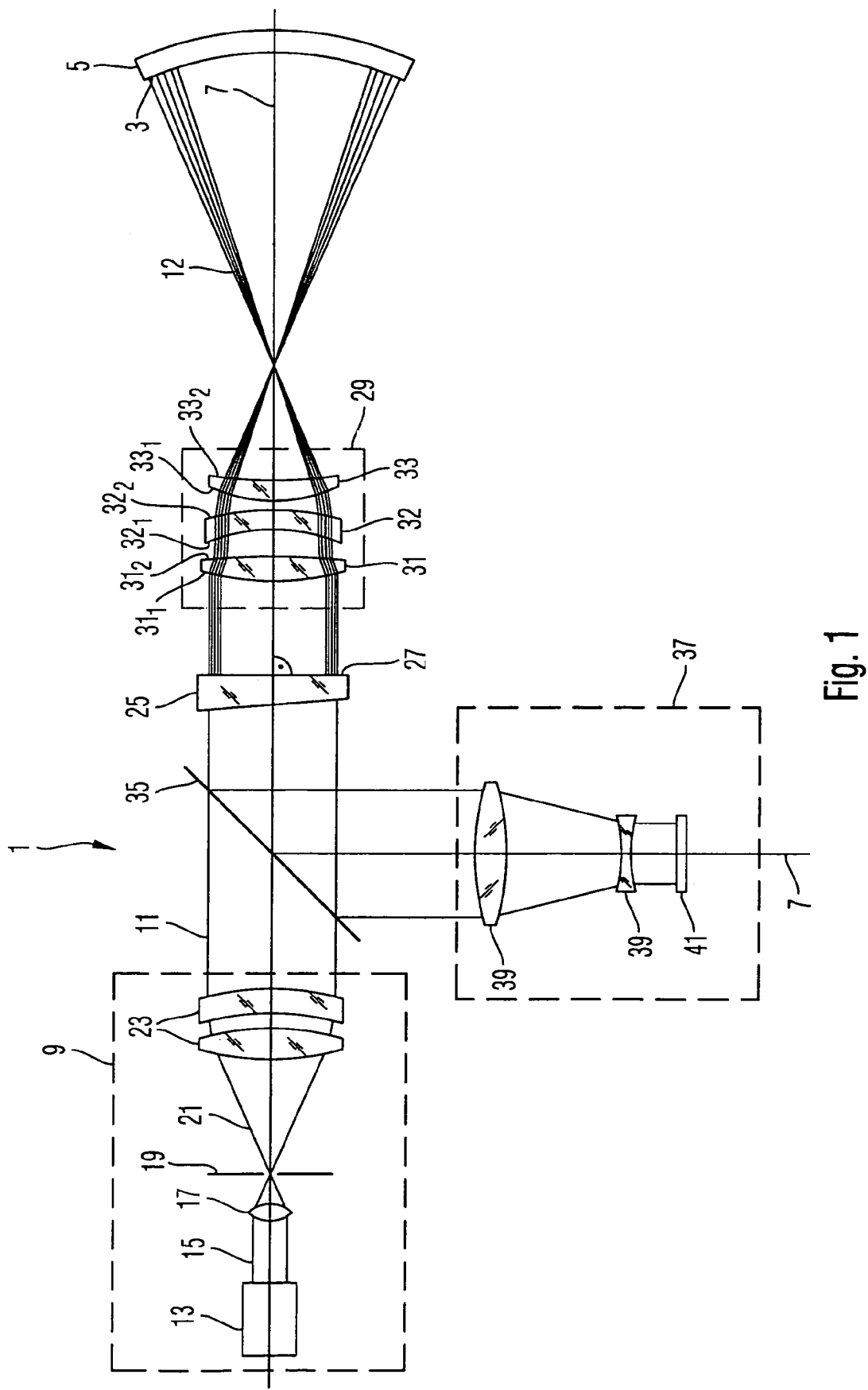
FIG. 1 is a sectional view of an interferometer arrangement for testing an aspherical optical element, according to the present invention.

In the exemplary embodiments described below, components that are alike in function and structure are designated as far as possible by alike reference numerals. Therefore, to understand the features of the individual components of a specific embodiment, the descriptions of other embodiments should be referred to.

The exemplary embodiments of methods described below involve interferometrically taking measurements of wavefronts generated by reflecting an incident beam provided by an interferometer apparatus from surfaces to be measured. Plural conventional interferometric methods may be used for taking such measurements. Examples of such interferometric methods are disclosed in e.g. U.S. Pat. No. 5,361,312, U.S. Pat. No. 5,982,490 and US 2002/0063867 A1. The entire contents of these patents and publications are incorporated herein by reference.

FIG. 1 schematically illustrates an interferometer apparatus 1 for testing a reflecting optical surface 3 of a mirror 5. The optical surface 3 is of an aspherical shape which is rotationally symmetric with respect to an optical axis 7. The interferometer apparatus 1 comprises a light source 9 for generating a beam 11 of measuring light. Light source 9 comprises a laser light source 13, such as a helium-neon-laser, emitting a laser beam 15. Beam 15 is focussed by a focussing lens 17 onto a pin hole of a spatial filter 19 such that a diverging beam 21 of coherent light originates from the pin hole of the spatial filter 19. Wavefronts in the diverging beam 21 are substantially spherical wavefronts. The diverging beam 21 is collimated by a group of lenses 23 to form beam 11 of measuring light such that beam 11 is a parallel beam having substantially flat wavefronts. The beam 11 traverses a wedge-shaped plate 25 having a flat surface 27 which is disposed orthogonally with respect to the optical axis 7 and which forms a Fizeau surface of the interferometer apparatus 1. A portion of beam 11 which is not reflected from the reference surface 27 traverses a null lens arrangement 29 comprising plural lenses 31, 32, 33 which are each rotationally symmetric with respect to the optical axis 7. The null lens arrangement 29 transforms the portion of beam 11 into a beam 12 such that the measuring light is orthogonally incident on mirror surface 3 at each location thereon.

The light reflected from the aspherical mirror surface 3 travels back along the optical axis 7 to enter the null lens arrangement 29. Null lens arrangement 29 transforms the aspherical wavefronts of the reflected light into wavefronts which are nearly flat wavefronts. Thereafter, the reflected light traverses the Fizeau surface 27 were it is superimposed with the reference light reflected from the Fizeau surface 27. The superimposed light is reflected from a beam splitter 35 and travels on an optical axis 7' oriented under an angle with respect to the optical axis 7 of the null lens arrangement 29. A camera 37 having a camera optics 39 and a light sensitive substrate 41 is concentrically arranged on the optical axis 7' such that the superimposed light is incident on the light sensitive substrate 41 to generate an interference pattern thereon.

The interference pattern is determined by an optical effect of the null lens arrangement 29, which is not traversed by the reference beam, and by an optical effect of the aspherical mirror surface 3. A shape of the aspherical surface 3 may be a precisely determined if the optical effect of the null lens arrangement 29 is known to a sufficiently high accuracy.

Figure 2:
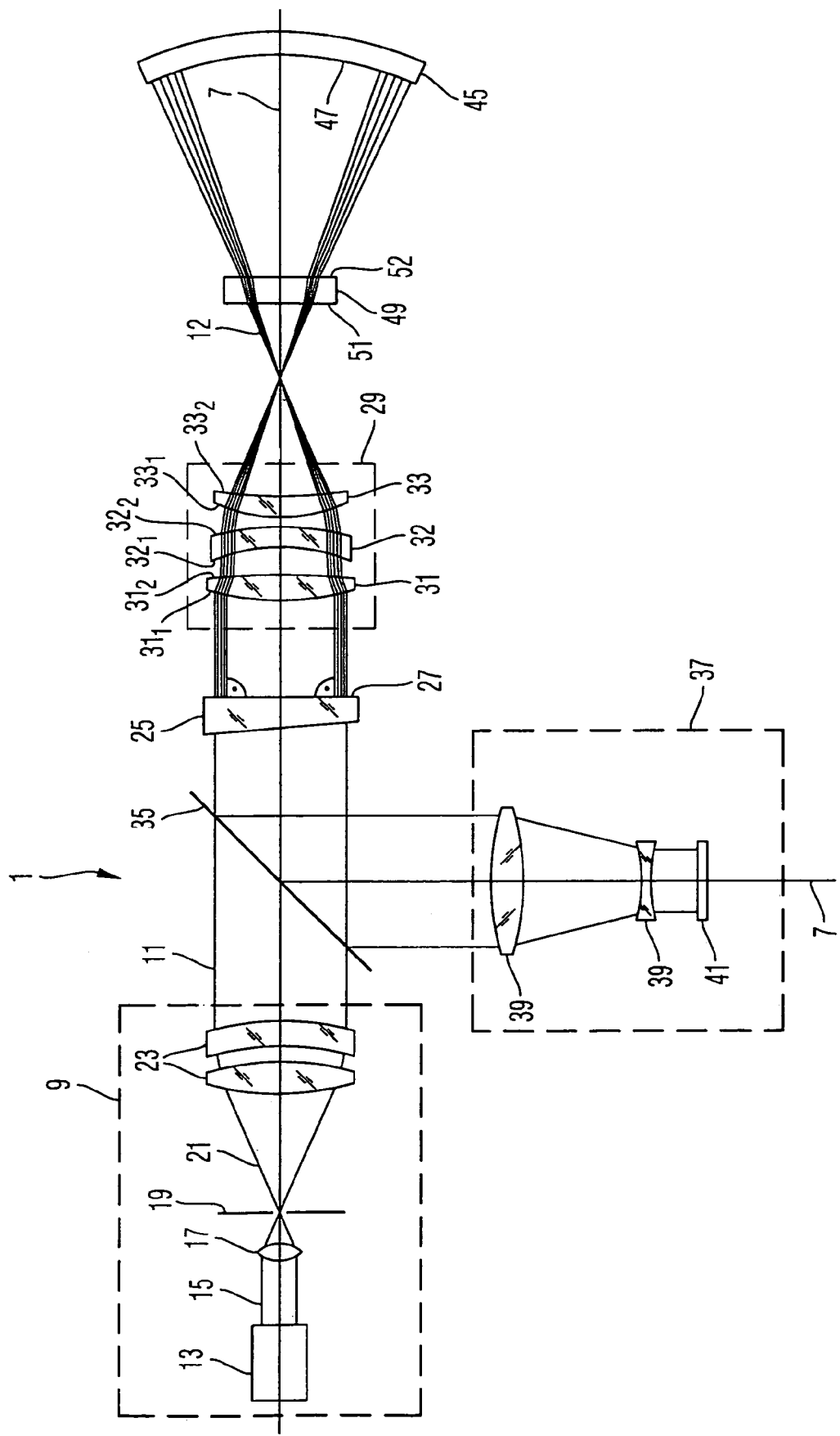
FIG. 2 shows an arrangement for calibrating the interferometer optics of the interferometer system shown in FIG. 1.

FIG. 2 illustrates an arrangement for calibrating the interferometer optics 29 of interferometer apparatus 1 shown in FIG. 1.

In this arrangement, mirror 5 is removed from the beam path of measuring light beam 12 emitted from the null lens arrangement 29, and is replaced by a calibrating mirror 45 having a mirror surface 47 of a precisely manufactured and independently tested spherical shape. In a beam path of measuring light beam 12 between the null lens arrangement 29 and spherical mirror surface 47 there is disposed a calibrating substrate 49 having two flat surfaces 51 and 52 which are parallel to each other. Substrate 49 is manufactured and independently tested to a high precision and designed such that the aspherical wavefronts of beam 12 emitted from the null lens arrangement 29 are transformed to substantially spherical wavefronts which are orthogonally incident on spherical mirror surface 47 at each location thereof.

Since the optical effects of calibrating substrate 49 and spherical mirror surface 47 are known to a sufficient accuracy, it is possible to determine the optical effect of null lens arrangement 29 from interference patterns detected by camera 37 in the arrangement shown in FIG. 2. This means that it is possible to calibrate the null lens arrangement 29 with the arrangement shown in FIG. 2. When the optical effect of null lens arrangement 29 is known, it is then possible to precisely determine the shape of aspherical surface 3 tested in the arrangement shown in FIG. 1.

Optical data of the arrangement shown in FIG. 1 relating to the Fizeau surface 27, the null lens arrangement 29 and the aspherical mirror 3 are shown in Table 1 below.

Herein, column 1 indicates the number of the respective optical surface as indicated in FIG. 1, column 2 indicates a diameter D of this surface, column 3 indicates a radius R of the respective surface, column 4 indicates a conic constant k of the respective surface, column 5 indicates a distance to the next surface in the beam path, and column 6 indicates the optical material between the respective adjacent surfaces, wherein BK7, SFL6 and BK7 represent trade names of the respective lens material as available from SCHOTT, Mainz, Germany.

TABLE 1

| Surface | D | R | k | Thickness | Material |
|---|---|---|---|---|---|
| 27 | 150 | ∞ | 0 | 100 | air |
| $31_1$ | 150 | 191.8419 | 0 | 24.5 | BK7 |
| $31_2$ | 150 | −509.5039 | 0 | 22 | air |
| $32_1$ | 140 | −213.0246 | 0 | 16 | SFL6 |
| $32_2$ | 140 | −371.7532 | 0 | 3.2 | air |
| $33_1$ | 130 | 89.8684 | 0 | 25 | BK7 |
| $33_2$ | 130 | 309.0819 | 0 | 692.7023 | air |
| 3 | 460.8 | −566.5299 | −0.145779 | | |

The aspherical surface 3 may be represented by the formula:

$$z = \frac{cr^2}{1 + \sqrt{1-(1+k)c^2r^2}} +$$
$$\alpha_1 r^2 + \alpha_2 r^4 + \alpha_3 r^6 + \alpha_4 r^8 + \alpha_5 r^{10} + \alpha_6 r^{12} + \alpha_8 r^{14}$$

wherein z represents the z-coordinate of the surface at a distance r from the optical axis 7, c is the curvature, k is the conic constant, and $\alpha_i$ are coefficients as indicated in table 2 below.

TABLE 2

| Coefficient | Value |
|---|---|
| $\alpha_1$ | 0 |
| $\alpha_2$ | 0 |
| $\alpha_3$ | $-2.3349818 \cdot 10^{-15}$ |
| $\alpha_4$ | $3.0165668 \cdot 10^{-20}$ |
| $\alpha_5$ | $-2.2784236 \cdot 10^{-25}$ |
| $\alpha_6$ | $8.0462743 \cdot 10^{-31}$ |
| $\alpha_7$ | $-2.0135068 \cdot 10^{-36}$ |
| $\alpha_8$ | 0. |

Corresponding optical data of the arrangement shown in FIG. 2 are indicated in table 3 below.

TABLE 3

| Surface | D | R | k | Thickness | Material |
|---|---|---|---|---|---|
| 27 | 150 | ∞ | 0 | 100 | air |
| $31_1$ | 150 | 191.8419 | 0 | 24.5 | BK7 |
| $31_2$ | 150 | −509.5039 | 0 | 22 | air |
| $32_1$ | 140 | −213.0246 | 0 | 16 | SFL6 |
| $32_2$ | 140 | −371.7532 | 0 | 3.2 | air |
| $33_1$ | 130 | 89.8684 | 0 | 25 | BK7 |
| $33_2$ | 130 | 309.0819 | 0 | 260 | air |
| 51 | 200 | ∞ | 0 | 42.65 | Suprasil |
| 52 | 0 | ∞ | 0 | 390.0523 | air |
| 47 | 448.88 | −554.1 | 0 | | |

The calibrating substrate 49 may be tested and manufactured according to an independent precision method as it is known e.g. from WO 03/002933 A1, and the spherical mirror 47 may be also tested and manufactured according to a conventional precision method.

Figure 3:
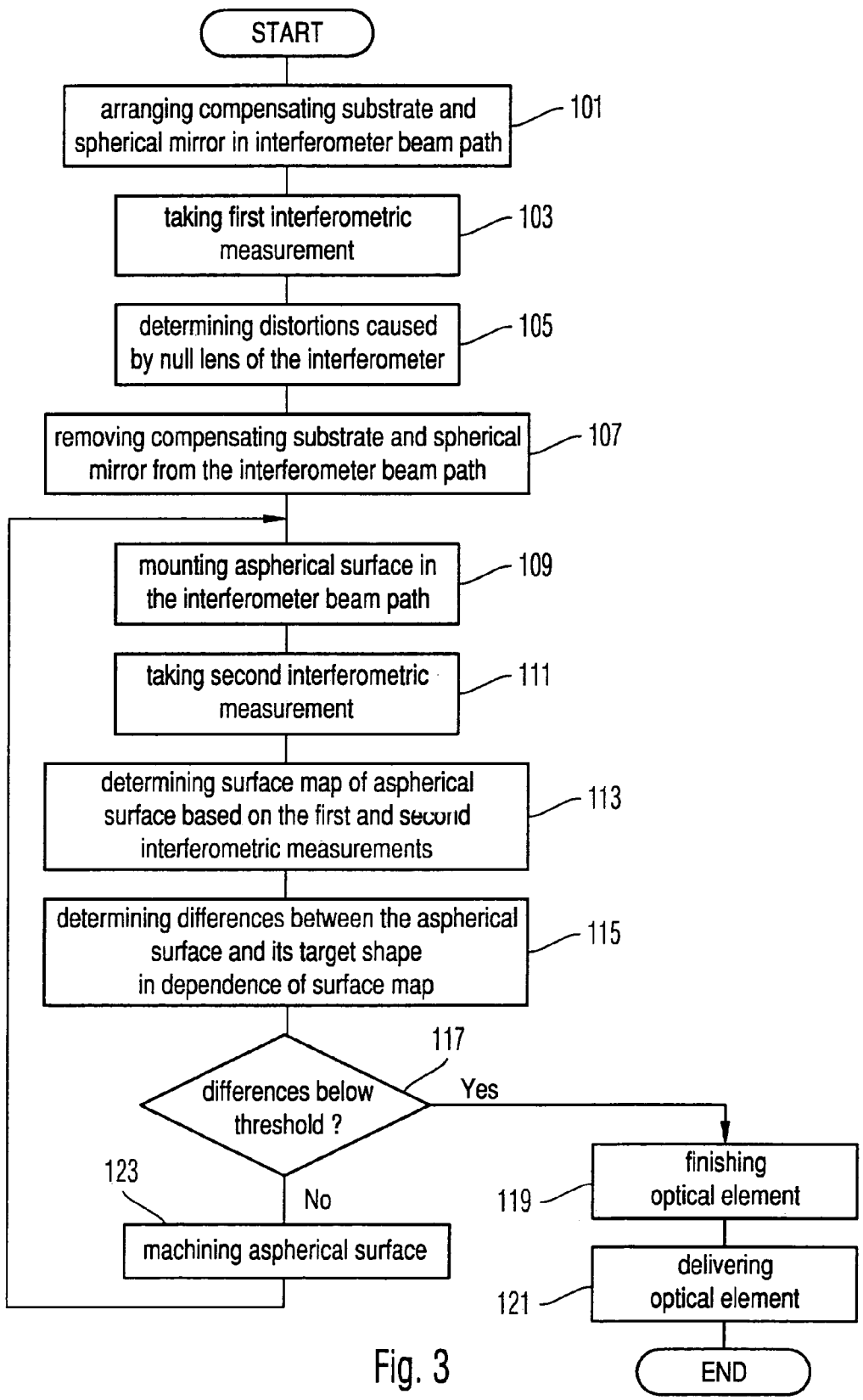
FIG. 3 is a flow chart of a method of processing an aspherical surface according to an embodiment of the present invention.

A method of manufacturing the aspherical surface 3 to a high accuracy is illustrated with reference to the flow chart shown in FIG. 3 below. The calibrating substrate 49 and the spherical mirror 47 are arranged in a beam path of beam 12 generated by null lens arrangement 29 in a step 101. First interferometric measurements with such arrangement are taken in a step 103, and the optical effect of null lens arrangement 29 is determined in a step 105. Thereafter, the compensating substrate 49 and the mirror 45 are removed from the beam path of beam 12 in a step 107, and the aspherical surface 3 to be tested and manufactured is arranged in the beam path of beam 12 in a step 109. Second interferometric measurements with the aspherical surface 3 arranged in beam 12 are taken in a step 111. By evaluating the interferometric measurement while taking the optical effects of the null lens arrangement 29 taking into account, a surface map of the aspherical surface is determined in a step 113.

The determined surface profile is compared to a predetermined target profile the aspherical surface should have when manufacturing thereof is finished in a step 115. In a step 117 a decision is made as to whether the tested aspherical surface corresponds to the specification for the finished mirror. If differences between the determined surface profile of the tested aspherical surface and the target profile of the finished aspherical surface are below a threshold, a finishing step 119 is performed on the aspherical surface 3. The finishing may include a final polishing of the surface or depositing a suitable coating, such as a reflective coating, an anti-reflective coating, and a protective coating.

A reflective coating may include, for example, a plurality of material layer pairs, for example 40 pairs of alternating molybdenum oxide and silicon oxide layers or other layers. Thicknesses of such layers may be about 5 nm and will be adapted to a wavelength to be reflected from the optical surface, such that a reflection coefficient is substantially high. Finally, the reflective coating may be covered by a protective cap layer for passivating the reflective coating. The cap layer may include a layer formed by depositing ruthenium, for example.

An anti-reflective coating which is intended to reduce reflections of radiation at a surface of the optical element, such as a lens element, may include magnesium fluoride or lanthanum oxide or other conventional materials.

If the determined surface profile differs from the target profile by more than the threshold, the mirror 5 is mounted on a machine tool for machining those surface portions of the aspherical surface 3 in which differences between the determined surface profile and the target surface profile exceed the threshold (step 123). Thereafter the testing procedure is repeated from the beginning with step 109.

The finished mirror is then delivered and included in an optical system for which it is designed in a step 121. Thereafter a next mirror 5 to be manufactured will be mounted in the interferometer arrangement 2 starting with step 109, and machining of its aspherical surface will be performed according to steps 109 to 123 as illustrated above.

The above mentioned threshold value will depend on the application of the aspherical surface in an optical system for which it is designed. For example, if the aspherical surface is a lens surface in an objective for imaging a reticle structure onto a resist with radiation of a wavelength $\lambda=193$ nm, such threshold value may be in a range of about 1 nm to 10 nm, and if the aspherical surface will be used as a mirror surface in an imaging objective using EUV (extreme ultraviolet) radiation with a wavelength of e.g. $\lambda=13.5$ nm, the threshold value will be in a range of about 0.1 nm to 1.0 nm.

It is to be noted that it is not necessary that the above-mentioned threshold is a constant threshold over the whole area of the optical surface. It is possible that the threshold is dependent on e.g. a distance from a center of the surface or some other parameters.

In the embodiment illustrated above with reference to FIGS. 1 and 2, the aspherical surface 3 is of a type such that the aspherical wavefronts of beam 12 may be transformed into spherical wavefronts by the calibrating substrate 49 having parallel flat surfaces 51, 52. Such usage of a plane parallel calibrating substrate is particularly useful for rotationally symmetric concave aspherical surfaces having a conic constant which is negative, and for rotationally symmetric convex aspherical surfaces having a conic constant which is positive.

Figure 4:
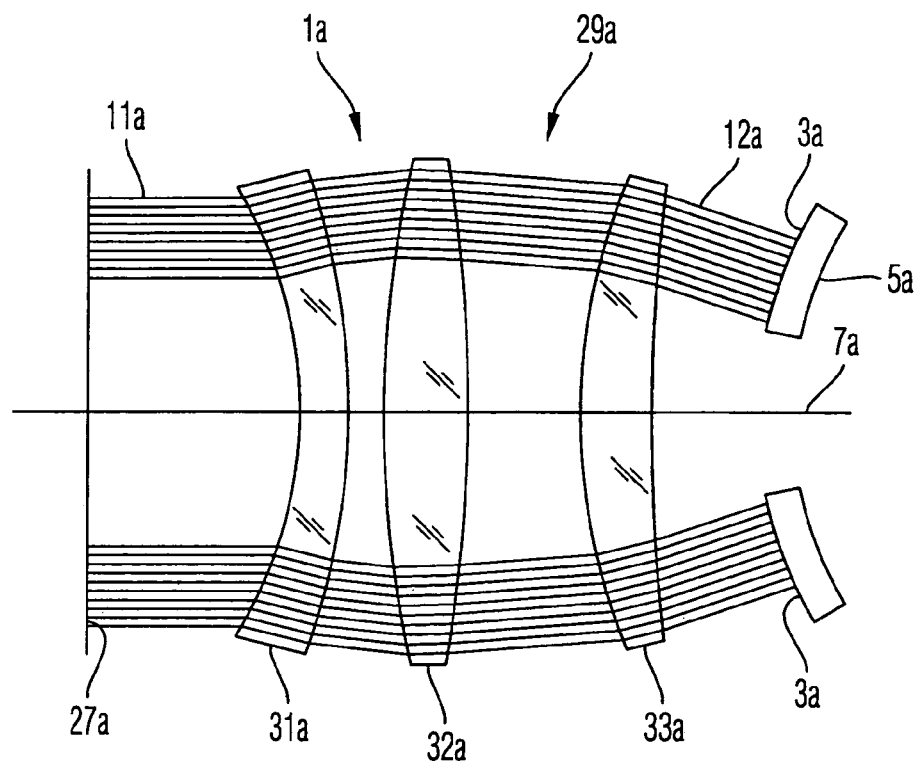
FIG. 4 is a detailed sectional view of an interferometer system similar to that shown in FIG. 1.

An application of the above illustrated method to testing other more general types of aspherical surfaces is illustrated with reference to FIGS. 4 and 5 below, wherein FIG. 4 corresponds to the arrangement shown in FIG. 1 for testing an aspherical surface 3a, wherein only a portion of interferometric apparatus 1a including a Fizeau surface 27a, lenses $31a$, $32a$, $33a$ of a null lens arrangement $29a$ and the aspherical surface $3a$ are shown in FIG. 4. Aspherical surface $3a$ is ring-shaped and has a central aperture of 104.2 mm in diameter.

Figure 5:
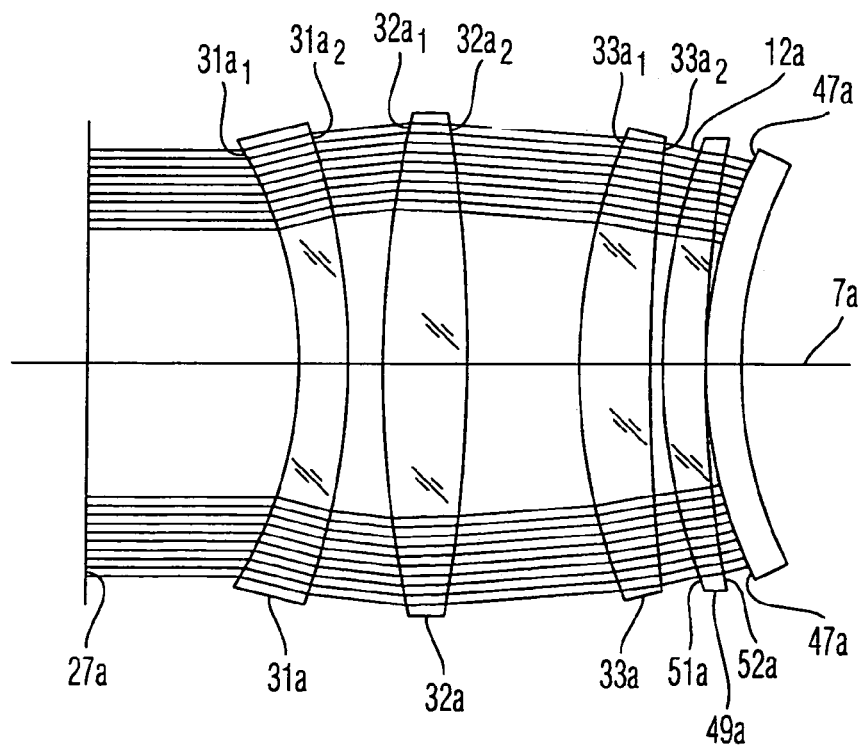
FIG. 5 shows an arrangement for calibrating the interferometer optics shown in FIG. 4.

FIG. 5 shows the arrangement corresponding to FIG. 4 above, where the aspherical surface $3a$ to be tested is removed from beam $12a$ for calibrating the null lens arrangement $29a$ by arranging a calibrating substrate $49a$ having surfaces $51a$ and $52a$ and a spherical mirror $47a$ are in beam $12a$.

Optical data of the arrangement shown in FIG. 4 are indicated in the following table 4:

TABLE 4

| Surface | D | R | Conic | Thickness | Material |
|---|---|---|---|---|---|
| 27a | 224.151 | ∞ | 0 | 100 | air |
| $31a_1$ | 223.9425 | −224.4447 | 0 | 26 | SUPRASIL |
| $31a_2$ | 235.8417 | −317.9638 | 0 | 16.00268 | air |
| $32a_1$ | 244.1642 | 538.8406 | 0 | 40 | SUPRASIL |
| $32a_2$ | 243.3695 | −895.1254 | 0 | 54.8643 | air |
| $33a_1$ | 228.7253 | 271.6911 | 0 | 34.8 | SUPRASIL |
| $33a_2$ | 222.1955 | 1032.593 | 0 | 21.45321 | air |
| 3a | 196 | 395.897 | −0.6496714 | 0 | MIRROR |

Coefficients of aspherical surface $3a$ are indicated in table 5 below.

TABLE 5

| Coefficient | Value |
|---|---|
| $\alpha_1$ | 0 |
| $\alpha_2$ | 0 |
| $\alpha_3$ | 6.0420689e−015 |
| $\alpha_4$ | −3.4161085e−020 |
| $\alpha_5$ | 2.2664053e−024 |
| $\alpha_6$ | −1.4333159e−028 |
| $\alpha_7$ | 0 |

Optical data corresponding to the arrangement shown in FIG. 5 are indicated in table 6 below.

TABLE 6

| Surface | D | R | Conic | Thickness | Material |
|---|---|---|---|---|---|
| 27a | 224.151 | ∞ | 0 | 100 | air |
| $31a_1$ | 223.9425 | −224.4447 | 0 | 26 | SUPRASIL |
| $31a_2$ | 235.8417 | −317.9638 | 0 | 16.00268 | air |
| $32a_1$ | 244.1642 | 538.8406 | 0 | 40 | SUPRASIL |
| $32a_2$ | 243.3695 | −895.1254 | 0 | 54.8643 | air |
| $33a_1$ | 228.7253 | 271.6911 | 0 | 34.8 | SUPRASIL |
| $33a_2$ | 222.1955 | 1032.593 | 0 | 4.720786 | air |
| 51a | 220.0000 | 365.171 | 0 | 17.00686 | SUPRASIL |
| 52a | 220.0000 | 1030.3 | 0 | 0 | air |
| 47a | 196 | 305.5364 | 0 | 0 | MIRROR |

In the above illustrated embodiments the interferometer arrangements are Fizeau-type interferometers. It is to be noted, however, that the invention is not limited to such type of interferometer. Any other type of interferometer, such as a Twyman-Green-type of interferometer, examples of which are illustrated in chapter 2.1 of the text book edited by Daniel Malacara, Optical Shop Testing, 2nd edition, Wiley interscience Publication (1992), a Michelson-type interferometer, examples of which are illustrated in chapter 2.1 of the text book edited by Daniel Malacara, a Mach-Zehnder-type of interferometer, examples of which are illustrated in chapter 2.6 of the text book edited by Daniel Malacara, a point-diffraction type interferometer, examples of which are illustrated in U.S. Pat. No. 5,548,403 and in the article "Extreme-ultraviolet phase-shifting point-diffraction interferometer: a wavefront metrology tool with subangstrom reference-wave accuracy" by Patrick P. Naulleau et al., Applied Optics-IP, Volume 38, Issue 35, pages 7252 to 7263, December 1999, and any other suitable type of interferometer may be used.

In the above, where surface errors are determined by an interferometric measurement any method for interferogram evaluation may be used. Possible applicable methods are disclosed in chapter 12 of the book edited by Daniel Malacara. Further, methods of phase shifting interferometry (PSI) may be applied, wherein a plurality of interferograms are analyzed for producing a surface map. Examples of phase shifting interferometry are presented in chapter 14 of the text book edited by Malacara. The phase shift is advantageously generated by varying the wavelength of the light providing the interferometric measuring beam using a wavelength tuneable light source.

It is further to be noted that the optical components involved in the above interferometric methods are subject to gravity during measurement. This may result in deformations of the surfaces of those components which are fixed in suitable mounts for arranging the components within the beam path of the interferometer. Even though the optical axis is oriented horizontally in FIGS. 1, 2, 4, 5, it is also possible to perform the same measurements with an optical axis oriented vertically in the gravitational field. In any event, it is possible to use mathematical methods to simulate deformations of the optical components in the gravitational field. One such method is known as FEM (finite element method). All determinations of optical properties and deviations illustrated above may involve taking into account results of such mathematical methods for correcting and/or improving the determined results.

The present invention has been described by way of exemplary embodiments to which it is not limited. Variations and modifications will occur to those skilled in the art without departing from the scope of the present invention as recited in the appended claims and equivalents thereof.

What is claimed is:

1. A method of calibrating an interferometer optics for measuring aspherical optical surfaces, the method comprising:

arranging a calibrating substrate having a first surface and a second surface opposite the first surface in a beam of measuring light emitted by the interferometer optics;

superimposing measuring light having traversed the first and second surfaces of the calibrating substrate and reference light and taking a first interferometric measurement of the superimposed measuring light and reference light; and determining optical properties of the interferometer optics in dependence of the first measurement.

2. The method according to claim 1, wherein the measuring light having traversed the calibrating substrate is reflected from a mirror having a predetermined shape, and wherein the measuring light reflected from the mirror traverses the calibrating substrate to enter the interferometer optics.

3. The method according to claim 1, wherein the interferometer optics has an optical axis and wherein the determined optical properties are rotationally symmetric properties with respect to the optical axis.

4. The method according to claim 1, wherein the interferometer optics has a reference surface from which the reference light is reflected and which is traversed by the beam of measuring light.

5. The method according to claim 1, wherein the first and second surfaces of the calibrating substrate are substantially flat surfaces.

6. The method according to claim 5, wherein the first surface is substantially parallel to the second surface.

7. A method of processing an optical element having an aspherical surface, the method comprising:
arranging a calibrating substrate having a first surface and a second surface opposite the first surface in a beam of measuring light emitted by an interferometer optics;
superimposing measuring light having traversed the first and second surfaces of the calibrating substrate with reference light, and taking a first interferometric measurement of the superimposed measuring light and reference light;
arranging the aspherical surface of the optical element in the beam of measuring light emitted by the interferometer optics, while the calibrating substrate is not arranged in the beam of measuring light;
superimposing measuring light having interacted with the aspherical surface and the reference light, and taking a second interferometric measurement of the superimposed measuring light and reference light;
determining deviations of the aspherical surface from a target shape thereof in dependence of the first and second measurements; and
machining the aspherical surface of the optical element.

8. The method according to claim 7, wherein the measuring light is reflected from the aspherical surface to enter the interferometer optics.

9. The method according to claim 7, wherein the measuring light having traversed the calibrating substrate is reflected from a mirror having a predetermined shape, and wherein the measuring light reflected from the mirror traverses the calibrating substrate to enter the interferometer optics.

10. The method according to claim 7, wherein the interferometer optics has an optical axis and wherein the determined optical properties are rotationally symmetric properties with respect to the optical axis.

11. The method according to claim 7, wherein the interferometer optics has a reference surface from which the reference light is reflected and which is traversed by the beam of measuring light.

12. The method according to claim 7, wherein the first and second surfaces of the calibrating substrate are substantially flat surfaces.

13. The method according to claim 12, wherein the first surface is substantially parallel to the second surface.

14. The method according to claim 13, wherein differences $w(\rho, \Theta)$ between the aspherical surface and a spherical surface approximating the aspherical surface may be represented in polar coordinates $\rho, \Theta$ as $$W(\rho, \Theta) = \sum_{i=0}^{\infty} a_{2i}\rho^{2i},$$

and wherein the following relation is fulfilled:

$a_{2i} < a_4$ for all $i > 2$.

15. The method according to claim 13, wherein differences $w(\rho, \Theta)$ between the aspherical surface and a spherical surface approximating the aspherical surface may be represented in polar coordinates $\rho, \Theta$ as $$W(\rho, \Theta) = \sum_{i=0}^{\infty} a_{2i}\rho^{2i},$$

and wherein the following relation is fulfilled:

$a_{2i} < 0.2 \cdot a_4$ for all $i > 2$.

16. The method according to claim 7, wherein the machining is performed in dependence of the determined deviations.

17. The method according to claim 7, wherein the machining is only performed if the determined deviations exceed a predetermined threshold.

18. The method according to claim 7, wherein the taking of the second interferometric measurement and the determining of the deviations of the aspherical surface from the target shape thereof are repeatedly performed.

19. The method according to claim 7, wherein the machining comprises finishing the optical surface of the optical element.

20. The method according to claim 19, wherein the finishing comprises applying a coating to the optical surface.

21. The method according to claim 20, wherein the coating comprises at least one of a reflective coating, an anti-reflective coating and a protective coating.

* * * * *